(12) United States Patent
Sprague et al.

(10) Patent No.: US 6,898,342 B2
(45) Date of Patent: May 24, 2005

(54) FIBER-ALIGNING OPTICAL SWITCH

(75) Inventors: Randall B. Sprague, Carnation, WA (US); Mitch Novack, Kenmore, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/216,055

(22) Filed: Aug. 8, 2002

(65) Prior Publication Data

US 2004/0028322 A1 Feb. 12, 2004

(51) Int. Cl.[7] .................................................. G02B 6/42
(52) U.S. Cl. ........................................... 385/20; 385/22
(58) Field of Search ........................... 385/15–18, 20–23

(56) References Cited

U.S. PATENT DOCUMENTS

| | | | |
|---|---|---|---|
| 4,265,513 A | 5/1981 | Matsushita et al. | |
| 4,303,302 A | 12/1981 | Ramsey et al. | 350/96.2 |
| 4,322,126 A | 3/1982 | Minowa et al. | |
| 4,415,228 A | 11/1983 | Stanley | |
| 4,505,539 A | 3/1985 | Auracher et al. | |
| 4,512,036 A | 4/1985 | Laor | 455/612 |
| 4,543,663 A | 9/1985 | Laor | 455/600 |
| 4,634,239 A | 1/1987 | Buhrer | |
| 4,651,343 A | 3/1987 | Laor | 455/600 |
| 4,657,339 A | 4/1987 | Fick | 350/96.205 |
| 5,187,758 A * | 2/1993 | Ueda et al. | 385/16 |
| 5,255,332 A | 10/1993 | Welch et al. | |
| 5,390,266 A * | 2/1995 | Heitmann et al. | 385/44 |
| 5,463,704 A | 10/1995 | Ziebol | |
| 5,757,991 A * | 5/1998 | Harman | 385/16 |
| 5,864,643 A | 1/1999 | Pan | 385/33 |
| 6,075,239 A | 6/2000 | Aksyuk et al. | |
| 6,205,267 B1 | 3/2001 | Aksyuk et al. | |
| 6,215,919 B1 | 4/2001 | Li et al. | |
| 6,253,007 B1 | 6/2001 | Laughlin | |
| 6,256,429 B1 * | 7/2001 | Ehrfeld et al. | 385/17 |
| 6,285,022 B1 | 9/2001 | Bhalla | |
| 6,289,145 B1 | 9/2001 | Solgaard et al. | |
| 6,360,036 B1 | 3/2002 | Couillard | |
| 6,463,190 B1 * | 10/2002 | Kato et al. | 385/16 |
| 6,603,895 B2 * | 8/2003 | Lu | 385/23 |
| 2001/0025107 A1 | 9/2001 | Barberich et al. | 546/273.7 |
| 2001/0041026 A1 * | 11/2001 | Steinberg et al. | 385/20 |
| 2001/0048785 A1 | 12/2001 | Steinberg | 385/20 |
| 2001/0051014 A1 | 12/2001 | Behin et al. | |
| 2002/0003921 A1 | 1/2002 | Horino et al. | 385/22 |
| 2002/0025107 A1 | 2/2002 | Heiks et al. | |
| 2002/0025108 A1 | 2/2002 | Lu | 385/23 |
| 2002/0150325 A1 * | 10/2002 | Noda | 385/16 |

OTHER PUBLICATIONS

Ohmori, Y. and Ogiwara, H., "Optical Fiber Switch Driven by PZT Bimorph," *Applied Optics*, vol. 17, No. 22, Nov. 15, 1978, pp. 3531–3532.

* cited by examiner

Primary Examiner—Edward J. Glick
Assistant Examiner—Thomas R Artman
(74) Attorney, Agent, or Firm—Blakely, Sokoloff, Taylor & Zafman LLP

(57) ABSTRACT

A mechanical optical switch provides an active switching mechanism and an active latching mechanism that are both actuated by piezoelectric elements. The switching mechanism includes a switching frame at which fiber ends are attached to be switched along an opposing array of fixed fiber ends. The active latching mechanism provides for a fast switching of the switching mechanism and a reliable holding of the switching positions. The elements of the switching mechanism and the latching mechanism are monolithically fabricated from a wafer. The piezoelectric elements are integrated by bonding. The switch is substantially free of gliding friction, which reduces switching forces and makes the switch highly reliable over an extended lifetime.

25 Claims, 5 Drawing Sheets

FIBER-ALIGNING OPTICAL SWITCH

FIELD OF THE INVENTION

The present invention relates generally to optical switches and in particular to mechanically actuated optical switches, which achieve switching by aligning fibers.

BACKGROUND OF THE INVENTION

The ability to switch optical signals is fundamental to further advances in many fields of optics. For example, in optical communications networks it is necessary to efficiently and rapidly switch signals propagating via waveguides, such as optical fibers. Specifically, what is required are optical 1×2 and 2×2 switches as well as more general N×M switches capable of single or gang operation.

The optical switching techniques taught by the prior art can generally be grouped into all-optical and mechanical approaches. All-optical approaches promise extremely rapid switching speeds but have a number of significant drawbacks, including low efficiency, low reliability and high cost. These limitations eliminate all-optical switches from applications in fiberoptic networks where high levels of reliability, longevity, switching precision and low cost are key.

A number of mechanical approaches to optical switching rely on external optical elements such as reflectors, prisms, gratings and shutters. In switches using such optical elements the signals are outcoupled from a given output fiber and are then incident on the external optical element. The optical element is mechanically adjusted to reflect, refract, diffract or otherwise pass the light from the output fiber to the intended input fiber to thus perform its switching function. In most of these switches the fibers are fixed and the optical elements are positioned on movable stages activated by solenoids, piezoelectric members or other mechanical actuators. The need to displace optical elements to achieve switching limits the speed and accuracy of these types of optical switches rendering them inadequate for fiber optic networks.

A number of mechanical optical switches move the fiber itself to effectuate switching. A number of these solutions involve bending the fibers to couple the optical signals between the chosen fibers. For example, U.S. Pat. No. 4,303,302 issued to Ramsey et al. teaches a piezoelectric optical switch which has a piezoelectric element with an optical fiber attached to it. A second optical fiber is placed in general proximity to the first optical fiber so that the fibers can be aligned by the piezoelectric element upon application of an appropriate voltage causing the piezoelectric element to bend and the mechanically coupled fibers to move into their predetermined switching position. Similarly, U.S. Pat. No. 4,657,339 issued to Fick teaches a fiber optic switch which bends the fiber with the aid of a piezoelectric element to achieve switching. Still other teachings, including U.S. Pat. No. 4,512,036, U.S. Pat. No. 4,543,663 and U.S. Pat. No. 4,651,343 all issued to Laor, teach bending the fiber with the aid of a bender assembly along a circumferential direction to couple signals between fibers arranged circularly around the fiber being bent. Patent Application US2002/60025108 teaches bending the fiber with the aid of a push-rod. Yet another teaching provided by Yutaka Ohmori et al., "Optical Fiber Switch Driven by PZT Bimorph", Applied Optics, Vol. 17, No. 22, 15 Nov., 1978, pp. 3531–3532 teaches to bend a fiber from a central position between two butted optical fibers by using a bimorph constructed with two sheets of PZT ceramics.

One drawback to mechanical switches, which bend fibers, is maintaining fiber planarity. Specifically, the bending of a fiber is not a very controllable process and it is difficult to keep the fiber in one plane as it is being bent. Therefore, switches relying on bending fibers suffer from alignment problems, thus rendering them inadequate for high speed and high accuracy optical networks.

Another drawback of prior art mechanical switches that utilize piezoelectric elements are difficulties in maintaining positioning accuracy and positioning repeatability. The bending of the piezoelectric element is dependent on the input voltage and effected by the resilience of the involved moving parts. Aging and varying operational conditions like voltage or temperature fluctuations limit positioning accuracy and repeatability during the devices lifetime.

Mechanical switches, which move the fiber without bending it, are taught in the prior art, such as in U.S. Pat. No. 5,864,643 issued to Pan. Pan teaches a miniature 1×N electromechanical optical switch and variable attenuator which has an array of end sections of output optical fibers, an end section of an input optical fiber and an actuator to effect a relative movement of the input optical fiber end section with respect to the output optical fiber end sections to form an optical path between the input optical fiber and a selected output optical fiber. Switching is performed by moving the input optical fiber in the plane of the array. Pan's switch uses an alignment controller for performing two alignment steps including a coarse alignment and then a fine alignment based on a feedback signal dependent on the alignment.

U.S. Patent Application US2001/0048785 to Steinberg teaches the use of a passive latching interface in the configuration of a roller element traveling in a groove for selectively coupling one or more fibers of a first array to one or more inputs of fibers of a second array. The groove in which the roller element travels has detents to facilitate more accurate registration or alignment between fibers of the first and second arrays. Steinberg's passive latching interface provides additional positioning accuracy on the expense of increased switching forces and eventual wear of the contacting parts of the latching interface.

Still other approaches employing a parallel translation of fibers by using a ball bearing and a sliding frame are described in U.S. Patent Applications US2002/0003921 and US2002/0025107. These solutions introduce well-known mechanical elements to provide a latching in predetermined switching positions. The prior art latching interfaces are passive and introduce additional parts that are prone to wear.

Therefore, there exists a need for a simple and robust optical switch providing for rapid switching, mechanical stability, accurate fiber alignment as well as longevity. The switch architecture should be adaptable to 1×2, 2×2 and N×M switches capable of single or gang operation.

OBJECTS AND ADVANTAGES

In view of the above, it is an object of the invention to provide an optical switch for aligning one or more input fibers with one or more output fibers rapidly and reliably. In particular, the optical switch is to be sufficiently robust and low-cost for deployment in optical networks and other optical switching systems.

It is also an object of the invention to provide an optical switch whose frame and architecture enable configuration as a 1×2, 2×2 and N×M switch for single or gang operation.

These and other objects and advantages will become apparent upon reading the following description.

SUMMARY

The objects and advantages of the invention are achieved by an optical switch that aligns a first fiber set with a second fiber set, where the first and second fiber sets can include as few as one fiber each. The switch has a primary frame for affixing the first fiber set and a switching frame for affixing the second fiber set opposite the first fiber set. The switching frame is flexibly attached to the primary frame. A first piezoelectric element is attached to the primary frame and to the switching frame such that it can displace the switching frame along a first linear direction relative to the primary frame. The optical switch also has a latching frame flexibly attached to the primary frame. The latching frame is provided for latching the switching frame in aligned positions between the first fiber set and second fiber set. In other words, the latching frame latches the switching frame when the fibers of the first and second fiber sets are in the desired switching positions.

In a preferred embodiment a second piezoelectric element is attached to the primary frame and the latching frame for engaging the latching frame with the switching frame in the aligned positions. In particular, the second piezoelectric element is configured to displace the latching frame between an engaged position in which the switching and latching frames are engaged and a disengaged position in which the switching and latching frames are disengaged. Most preferably, the second piezoelectric element moves the latching frame between the engaged and disengaged positions along a second linear direction, which is orthogonal to the first linear direction. The piezoelectric elements are controlled by a suitable control unit, e.g., a controlled voltage source.

In the same or in a different embodiment, the primary frame has a first V-groove set for affixing the fiber or fibers belonging to the first fiber set to the primary frame. Similarly, the switching frame has a second V-groove set for affixing the fiber or fibers belonging to the second fiber set to the switching frame.

The switching and latching frames can be equipped with a latching mechanism such as a mechanical latching mechanism for engaging them. Suitable latching interfaces include teeth and recesses.

Two leg members hold the switching frame flexibly within the primary frame such that the switching frame's orientation is precisely maintained at all switching positions. At the same time, the leg members provide for a resilient movement of the switching frame in direction of the fiber array. Likewise, two leg members hold the latching frame in a resilient fashion such that it engages or disengages the latching interface when a voltage is applied to the coupled second piezoelectric element.

All mechanical components except the piezoelectric elements are monolithically fabricated from a wafer. There is no sliding friction inside the mechanism, which makes its operation highly stable. A large aspect ratio of the components contributing to the linear movement of the switching frame provide for dynamic stiffness of the switching frame against out of plane motion. Well-known fabrication techniques are utilized to economically fabricate the device.

Optical switches in accordance with the invention can be used to switch small or large numbers of fibers. In general, the first fiber set has a number N of active fibers and the second fiber set has a number M of active fibers thus forming an N×M switch. N and M can be unequal or equal with a minimum number of 1.

The optical switch in accordance with the invention and the method of aligning fibers can be employed in various optical systems including optical communications networks such as WDM and DWDM systems. The details of the invention are presented in the below description with reference to the attached drawing figures.

DETAILED DESCRIPTION

Figure 1:
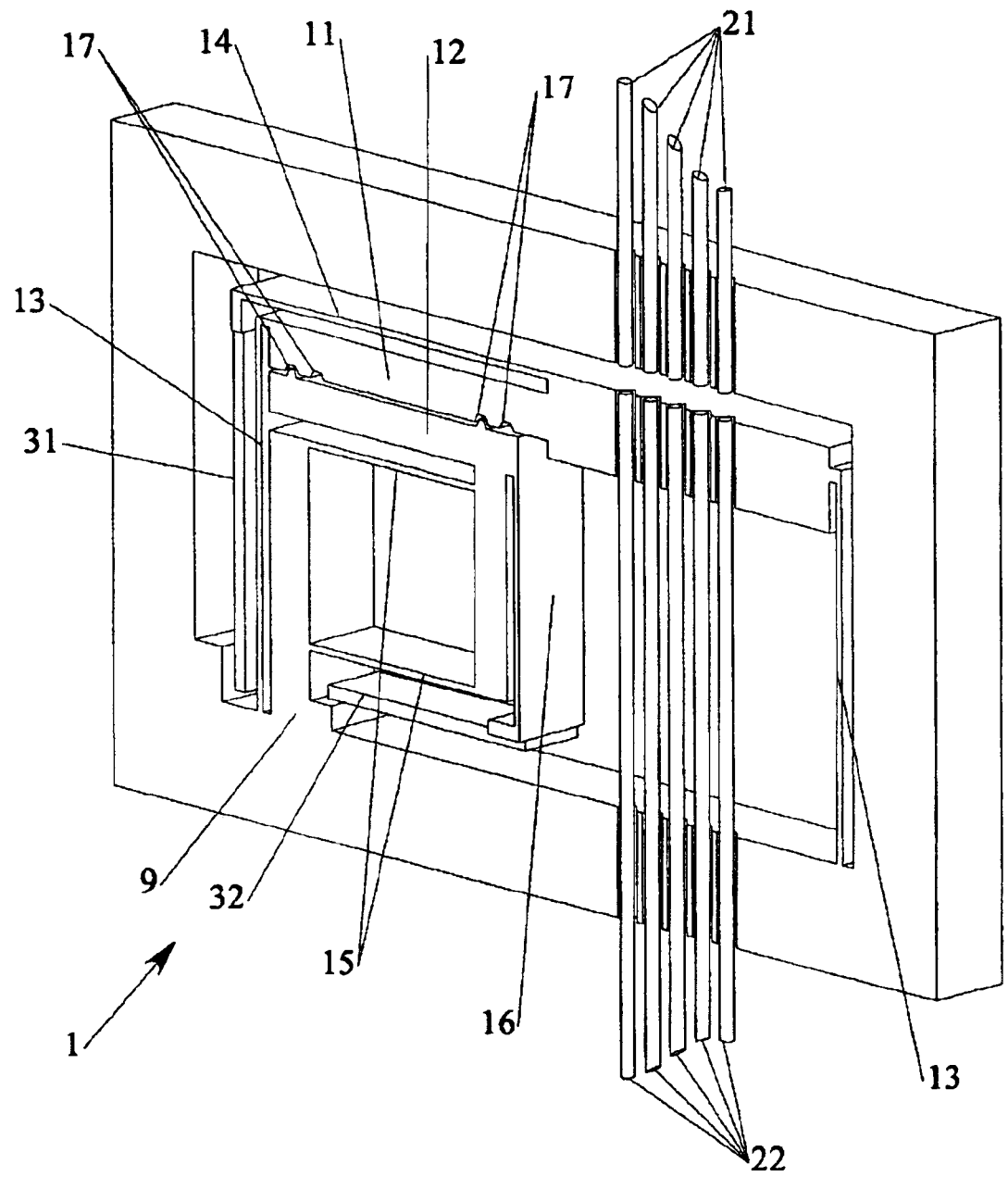
FIG. 1 is an isometric view of a preferred embodiment of an optical switch in accordance with the invention.
Figure 2:
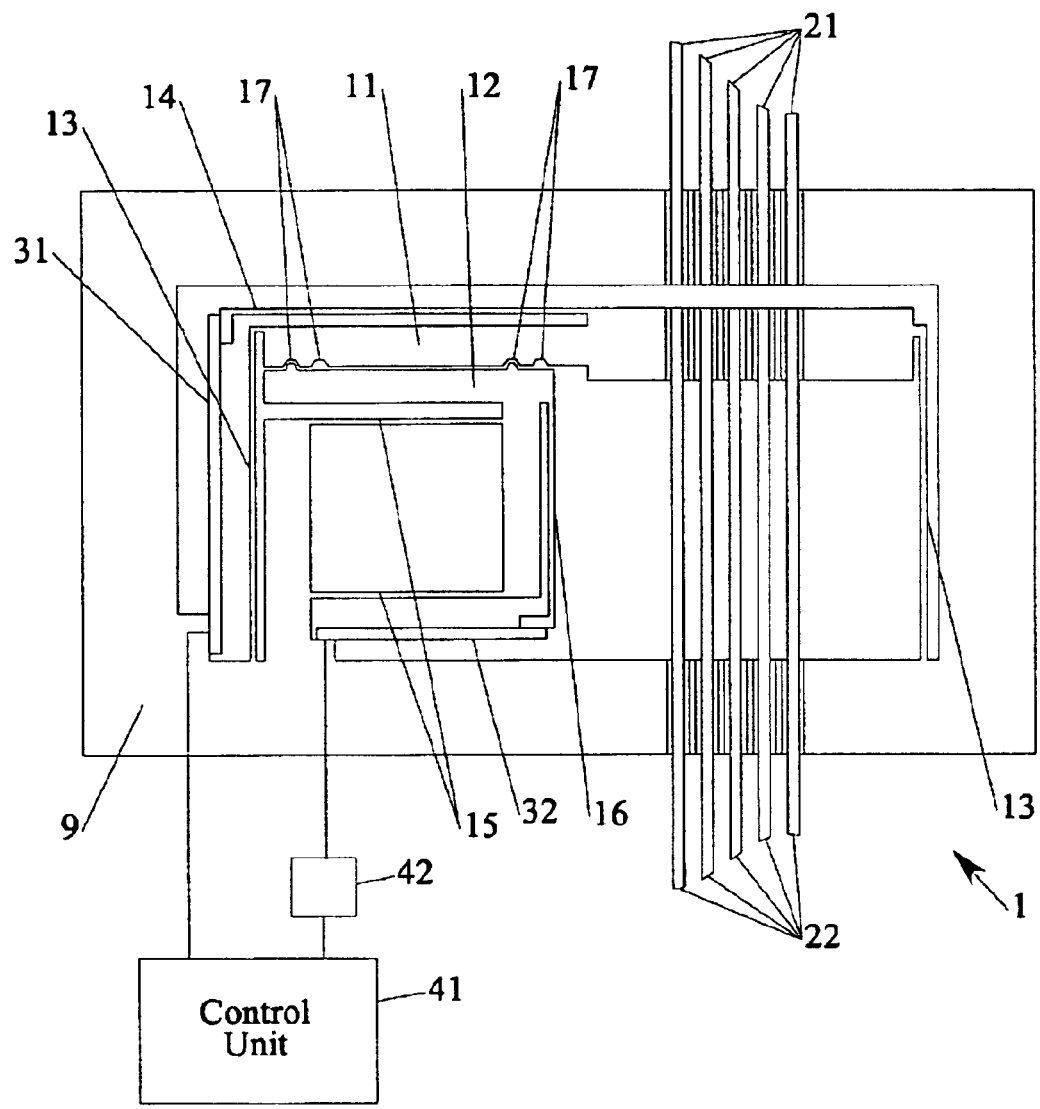
FIG. 2 is a plan top view of the optical switch of FIG. 1

FIGS. 1 and 2 illustrate a preferred embodiment of an optical switch 1 in accordance with the invention. A primary frame 9 includes a switching frame 11 and a latching frame 12, which are flexibly connected to a body 10 via first and second legs 13, 15 (see also FIG. 3). The primary frame 9 surrounds the assembly and provides for stiffness and for attachment of a housing (not shown).

The optical switch 1 features two piezoelectric elements 31, 32. The first piezoelectric element 31 is part of a switching mechanism that performs the mechanical switching. The switching frame 11 is also part of the switching mechanism. A latching mechanism includes a second piezoelectric element 32 and the latching frame 12, which is actuated by the second piezoelectric element 32. Both piezoelectric elements 31, 32 are well-known bending elements that bend in response to a voltage applied by a control unit 41.

The piezoelectric elements 31, 32 are bonded with one end on the primary frame 9 and with their moving end on couplers 14, 16. The couplers 14, 16 are sufficiently flexible to absorb the angular movement of the piezoelectric elements' 31, 32 moving ends. In that way, the bending movement of the piezoelectric elements 31, 32 is simply transmitted onto the substantially linearly moveable frames 11, 12.

Figure 3:
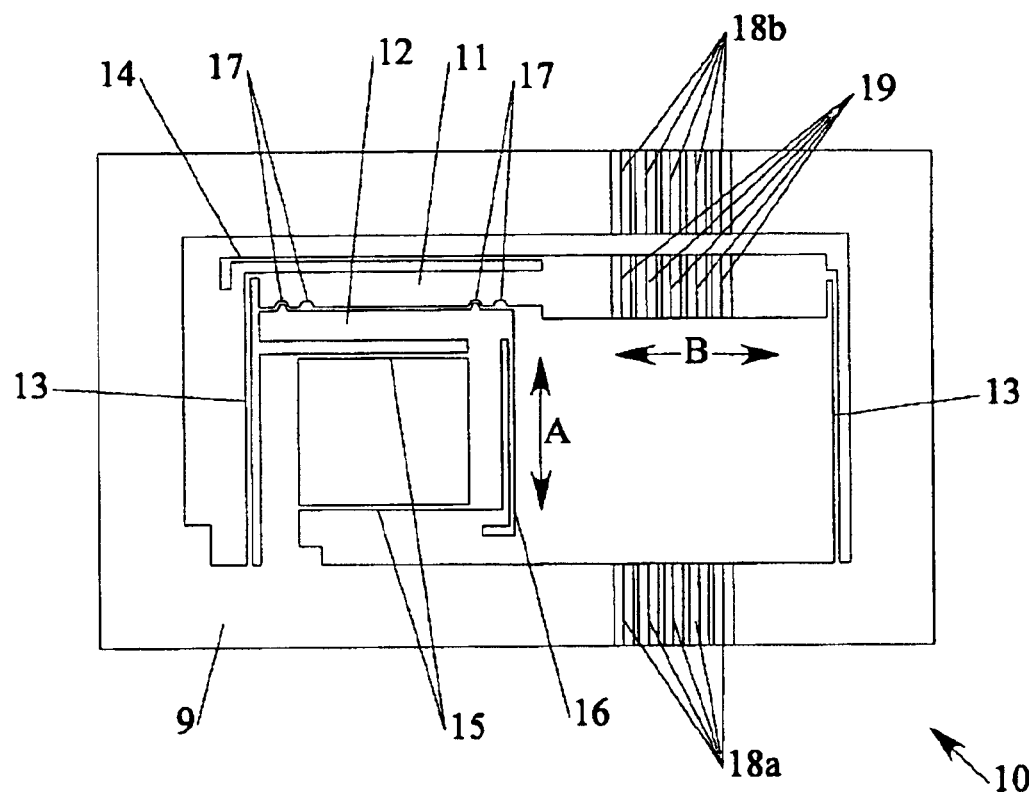
FIG. 3 shows the monolithic body detailing its movements and connections of the piezoelectric elements.

A first fiber array 21 is bonded on the primary frame 9, preferably in V-grooves 18a (see FIG. 3). A second fiber array 22 is bonded on the primary frame 9, preferably in V-grooves 18b. The second fiber array 22 is also bonded with its ends in the V-grooves 19 of the switching frame 11. V-grooves 18b and 19 are in a certain distance providing sufficient bending length to the fibers of the fiber array 22. During switching, where the switching frame 11 moves along switching direction B (see FIG. 3), the fibers of the second fiber array 22 bend between their two bonded sections. The fiber arrays 21, 22, which are depicted in cutoff view, transmit information carrying light as is well known for fiber optical systems. The ends of both fiber arrays 21, 22 are positioned with respect to each other such that light emitted from one fiber end is efficiently received by an opposing fiber end.

The switching frame 11 and the latching frame 12 feature correspondingly shaped teeth and recesses that form a latching interface 17. The latching frame 12, the second coupler 14, the legs 15 and the second piezoelectric element 32 define an active latching mechanism that actively engages and/or disengages the latching interface 17. While a switching movement is initiated by the first piezoelectric element 31, the latching interface 17 is actively disengaged by the second piezoelectric element 32.

After the new switching position is reached, the latching interface 17 is engaged again and the switching frame 11 is fixed. The engaging may be actuated by the piezoelectric element 32 or springy engage as the result of internal tension of the piezoelectric element 32 in its assembly position.

The spacing between the recesses conforms to the spacing of the fibers such that the fiber ends are highly precise aligned in each switching position. The switching spacing is preferably between 100–200 microns. The scope of the invention includes embodiments where spacing is less than 100 microns or more than 200 microns. The active disengaging substantially eliminates friction and wear in the latching interface 17. As one result, switching speed and lifetime of the optical switch 1 are increased. As another result, the required switching forces and consequently the size of the piezoelectric element 31 are kept to a minimum.

The latching mechanism operates in accordance with the teachings for the switching mechanism described in the paragraphs above. The latching frame 12 moves substantially linear along the latching direction A (see FIG. 3) which preferably essentially orthogonal to the switching direction B (see FIG. 3). The scope of the invention encompasses embodiments in which the latching direction A is in a non-orthogonal orientation relative to the switching direction B. In the preferred embodiment, the latching frame 12 has an L-shape such that an extended contacting area is provided between latching frame 12 and switching frame 11. The extended contacting area provides sufficient spacing for the latching interface 17.

A criterion for optical switching efficiency is parallelism between the opposing fiber arrays 21, 22 in all switching positions. One contributing factor is the configuration of the legs 13 in combination with the lengthy switching frame 11 to define a flexible parallelogram. Both legs 13 are highly symmetric in shape with a substantially identical deformation characteristic, which results in a substantially parallel movement of the switching frame 11. The further the legs 13 are apart for a given length of them, the more accurate the opposing fiber ends are kept parallel at all switching positions. An aspect ratio is defined as the proportion of the distance between the legs 13 and their length. In the preferred embodiment the aspect ratio is about 2:1. Another contributing factor is parallelism of the latching interface 17, which is provided to a high degree by having a substantially identical aspect ratio of the legs 13 and of the legs 15. Another factor for deflection stability is the ratio between height and thickness of legs 13, 15, which is preferably in the range between 10:1 to 25:1. Length and width of the legs 13, 15 is adjusted in correspondence to the maximum switching and latching movement such that the material strain remains well within the elastic deformation boundaries as may be appreciated by anybody skilled in the art. The length of the legs 13, 15 may be selected in proportion to maximum switching and latching movement. In the preferred embodiment, the switching and latching movement may be about 150 $\mu$m. For such exemplary movement range, the length of legs 13, 15 may be about 5 mm.

The legs 13, 15 have a high stiffness in protrusion direction. Arranging the legs 13 parallel to the latching direction A and the legs 15 parallel to the switching direction B advantageously utilizes the legs' 13, 15 directional stiffness. As one result, the switching frame 11 is unaffected by the latching impact of the latching frame 12, and maintains the spacing between the two fiber arrays 21, 22 with high precision and substantially free of vibrations. As another result, the latching frame 11 provides high positioning stiffness while it is actuated with minimum force. The piezoelectric element 32 is consequently kept at a scale that allows an easy integration of it within the optical switch 1.

In the present invention, the fiber array 22 is bent in a fully defined fashion. Internal stress in the fibers of the array 22 and its bonding sections is thereby kept to a minimum by adjusting the deformation characteristic of the legs 13 to that of the array's 22 fibers.

Turning to FIG. 3, the fabrication of the monolithic body 10 is explained in detail. The body 10 is preferably fabricated from a wafer having an exemplary thickness of 500 $\mu$M. The V-grooves 18a, 18b, and 19 are etched in a single KOH etch step. All other features are fabricated in a single DRIE etch step. The etching of the gap between the switching frame 11 and the latching frame 12 results in a certain latching slackness in the released latching interface 17. This may be compensated by an active engaging force of the piezoelectric element 32. Since the power consumption is very little, a temporary power supply 42 (see FIG. 2) may provide the power source during eventual power outages. Such temporary power supply 42 may be a capacitor. The latching slackness may also be overcome by bonding the piezoelectric element 32 with a certain pre-bend such that the latching interface 17 is forced to fully engage when no voltage is applied to the piezoelectric element 32. The pre-bend may be induced by applying a voltage to the piezoelectric element 32 while bonding it.

Referring to FIGS. 4a, 4b, and 5a, 5b the operation of the optical switch 1 in the exemplary configuration as a 1×2 switch (see FIGS. 4a, 4b) and as a 2×2 switch (see FIGS. 5a, 5b) is explained. It is noted that the FIGS. 4a, 4b, 5a, 5b exemplarily depict the bent fiber array 22 as input lines and the fiber array 21 as output lines. The scope of the invention includes embodiments, where the bent fiber array 22 are the output lines and the fiber array 21 are/is the input line(s).

Figure 4A:
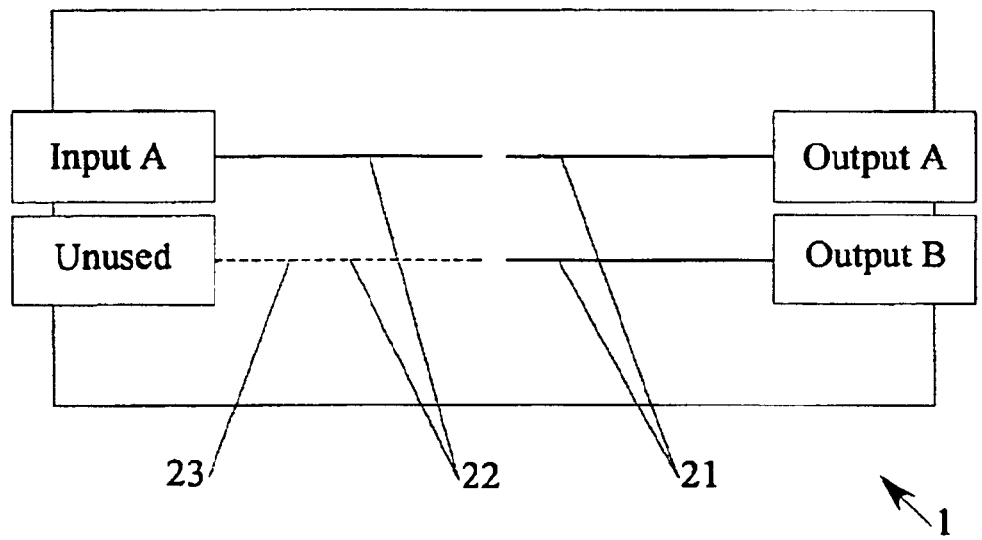
FIGS. 4a, 4b illustrate schematically a 1×2 switch configuration including an unused fiber.
Figure 4B:
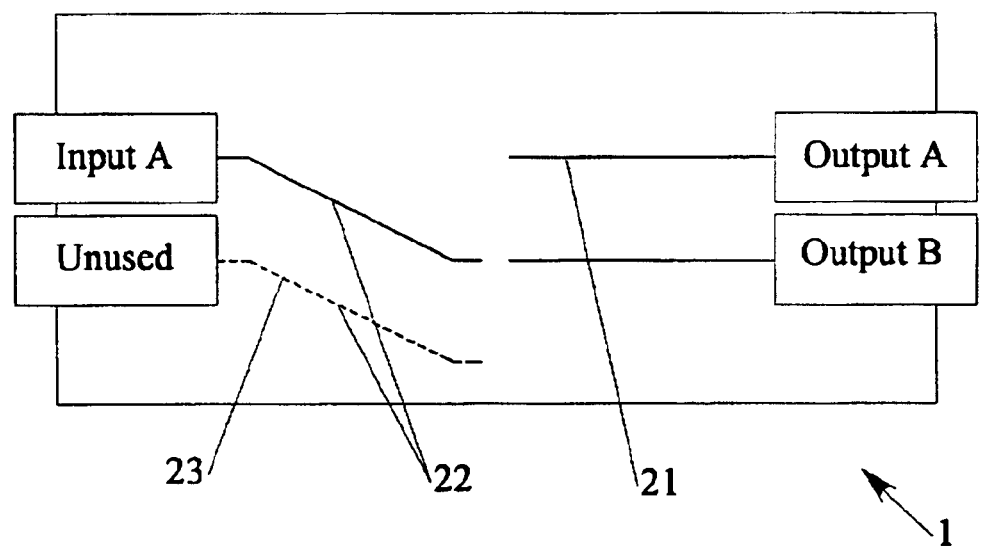

FIGS. 4a, 4b illustrate the case of a 1×2 switch configuration where two output lines are associated with a single input line. A blind, unused line 23 may be substituted for an input line. The unused line 23 is an eventual result of a fabrication technique, where the fibers are first put in place and then cut the fibers at the gap between switching frame 11 and primary frame 9. This has inherent alignment and assembly advantages, but it results in the dead unused fiber 23. FIG. 4a, a first switching position is shown where the exemplary Input is switched with the Output A. In FIG. 4b, a second switching position is shown where the exemplary Input is switched to the Output B.

Figure 5A:
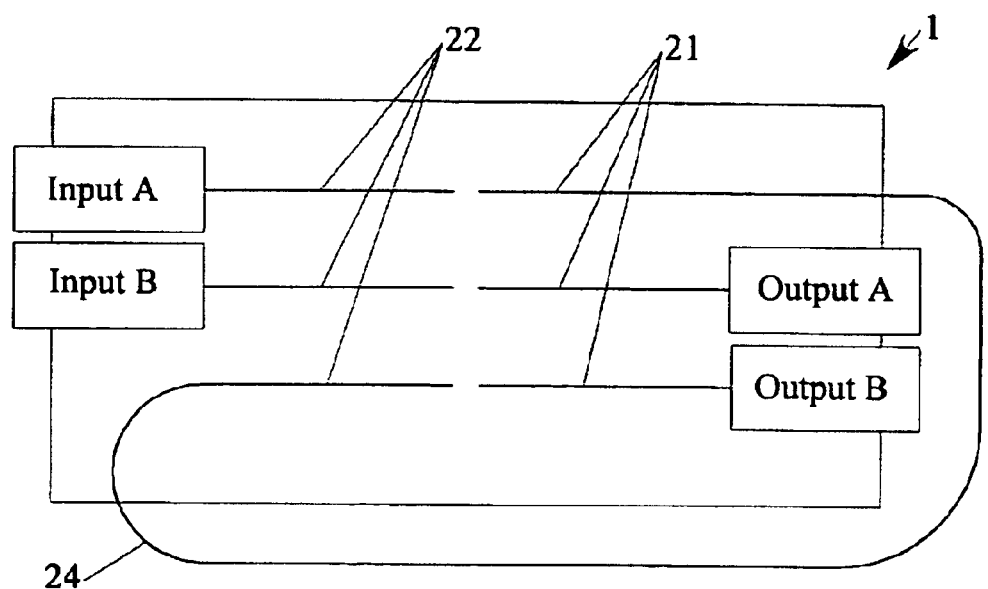
FIGS. 5a, 5b illustrate schematically a 2×2 switch configuration including a jumper fiber.
Figure 5B:
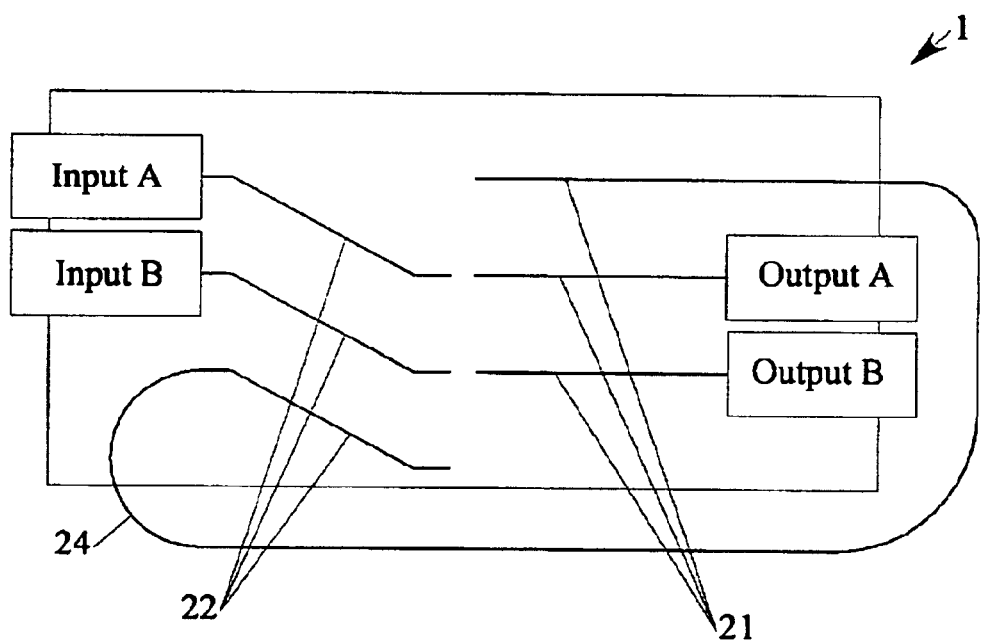

FIGS. 5a, 5b illustrate the case of a 2×2 switch configuration where two output lines are associated to two input lines. A jumper bridge 24 may be utilized in that case. In FIG. 5a, a first switching position is shown where the exemplary Input A is switched via the jumper bridge 24 with the Output B and Input B is directly switched with Output A. In FIG. 5b, a second switching position is shown where the Input A is directly switched with Output A and Input B is directly switched with Output B. In the second switching position, the jumper bridge 24 remains unused.

In the Figures, the optical switch 1 is depicted with two switching positions. Nevertheless, the scope of the invention is not limited to a specific number of switching positions. As can be appreciated by anyone skilled in the art, the latching interface 17 may be configured to provide N switching positions for an M number of fiber sets. Configuration of all other elements of the optical switch 1 involved for switching and latching may be accordingly adjusted.

Prior to operation, the control unit 41 is calibrated to provide the voltages to the piezoelectric elements 31, 32 at levels such that the frames 11, 12 are actuated within the required ranges. The optical switch 1 is mounted inside a well-known IC package. The primary frame 9 would be mounted in the corners on standoffs so that the moving portion of the monolithic body 10 has clearance to the package. The fibers of the fiber arrays 21, 22 may be routed through the sides of the package and bonded into the V-grooves 18*a*, 18*b*, 19.

The optical performance of the switch depends on efficient coupling between the opposing fiber ends. To ensure good coupling, the fibers have preferably polished ends to minimize coupling losses. In addition or alternatively, the cavity of the switch package may be filled with optical fluid to minimize back reflections and to reduce eventual beam flaring. In both cases it is desirable keeping the gap between the fibers to a minimum. An exemplary gap width is in the range of 3–10 μm.

Accordingly, the scope of the invention described in the specification above is set forth by the following claims and their legal equivalent.

What is claimed is:

1. A mechanical optical switch for switching a first fiber end relative to a second fiber end, said optical switch comprising:
    a switching mechanism for switching said first fiber end;
    a latching mechanism for actively disengaging a latching interface between said switching mechanism and said latching mechanism while said switching mechanism is switching, and for fixedly holding a switching position of said switching mechanism while said switching mechanism is not switching;
    a first piezoelectric element to actuate the switching mechanism; and
    a first coupler to receive a bending movement of the first piezoelectric element and to absorb an angular movement of a moving end of the first piezoelectric element, wherein a linear force substantially free of torque is transmitted onto said switching mechanism.

2. The optical switch of claim 1, wherein said switching mechanism comprises a switching frame and said latching mechanism comprises a latching frame, wherein said switching frame and said latching frame are part of a monolithic structure.

3. The optical switch of claim 2, wherein said monolithic structure is fabricated from a wafer.

4. The optical switch of claim 2, further comprising at least two flexible legs for flexibly connecting said switching frame to a primary frame, wherein said at least two flexible legs comprise a deformation characteristic that is substantially equal to a deformation characteristic of a bent fiber bonded to said primary frame and said switching frame, said bent fiber providing said first fiber end.

5. The optical switch of claim 1, further comprising a second piezoelectric element to actuate the latching mechanism.

6. The optical switch of claim 5, further comprising a second coupler to receive a bending movement of said second piezoelectric element and to absorb an angular movement of a moving end of said second piezoelectric element, wherein a linear force substantially free of torque is transmitted onto said latching mechanism.

7. The optical switch of claim 1, further comprising a controller coupled to the first piezoelectric element.

8. The optical switch of claim 1, further comprising a latching interface to engage the switching mechanism and the latching mechanism, wherein the latching interface includes teeth and recesses.

9. An optical switch for aligning a first fiber set comprising at least one fiber with a second fiber set comprising at least one fiber, said optical switch comprising:
    a) a primary frame for affixing said first fiber set;
    b) a switching frame for affixing said second fiber set opposite said first fiber set, said switching frame being flexibly attached to said primary frame;
    c) a first piezoelectric element attached to said primary frame and to said switching frame for displacing said switching frame along a first linear direction; and
    d) a latching frame flexibly attached to said primary frame for latching said switching frame in aligned positions between said first fiber set and said second fiber set.

10. The optical switch of claim 9, further comprising a second piezoelectric element attached to said primary frame and to said latching frame for engaging said latching frame with said switching frame in said aligned positions.

11. The optical switch of claim 10, wherein said second piezoelectric element is configured to displace said latching frame between an engaged position in which said switching frame and said latching frame are engaged and a disengaged position in which said switching frame and said latching frame are disengaged.

12. The optical switch of claim 11, wherein said second piezoelectric element is further configured to move said latching frame between said engaged position and said disengaged position along a second linear direction orthogonal to said first linear direction.

13. The optical switch of claim 10, further comprising a control means for controlling said first piezoelectric element and said second piezoelectric element.

14. The optical switch of claim 9, wherein said primary frame further comprises a first V-groove said first fiber set is affixed in said first V-groove set.

15. The optical switch of claim 9, wherein said switching frame further comprises a second V-groove set and said second fiber set is affixed in said second V-groove set.

16. The optical switch of claim 9, wherein said switching frame and said latching frame comprise a latching means for engaging said latching frame with said switching frame.

17. The optical switch of claim 16, wherein said latching means comprises a mechanical latching means.

18. The optical switch of claim 17, wherein said mechanical latching means comprises teeth and recesses.

19. The optical switch of claim 9, wherein said primary frame, said switching frame and said latching frame have a substantially equal aspect ratio.

20. The optical switch of claim 9, wherein said switching frame is flexibly attached to said primary frame by two leg members.

21. The optical switch of claim 9, wherein said latching frame is flexibly attached to said primary frame by two leg members.

22. The optical switch of claim 9, wherein said first fiber set and said second fiber set are separated by a gap filled with an optical material.

23. A method for aligning a first fiber set comprising at least one fiber with a second fiber set comprising at least one fiber in an optical switch having a primary frame, a switching frame flexibly attached to said primary frame, and a latching frame flexibly attached to said primary frame, said method comprising:
    a) affixing said first fiber set to said primary frame;
    b) affixing said second fiber set opposite said first fiber to said switching frame;

c) providing a first piezoelectric element for displacing said switching frame along a first linear direction;
d) providing a second piezoelectric element for engaging said latching frame with said switching frame;
e) aligning said first fiber set with said second fiber set in a first aligned position; and
f) engaging said switching frame with said latching frame in said first aligned position.

24. The method of claim 23, wherein said second piezoelectric element moves said latching frame along a second linear direction orthogonal to said first linear direction.

25. The method of claim 24, further comprising disengaging said latching frame from said switching frame and displacing said switching frame along said first linear direction to a second aligned position.

* * * * *